Sept. 25, 1956

E. S. PURINGTON 2,764,630

TELEVISION TRANSMISSION SYSTEM

Filed April 1, 1952

3 Sheets-Sheet 1

Inventor

ELLISON S. PURINGTON.

By [signature]

Attorney

Sept. 25, 1956 E. S. PURINGTON 2,764,630

TELEVISION TRANSMISSION SYSTEM

Filed April 1, 1952 3 Sheets-Sheet 2

Inventor

ELLISON S. PURINGTON.

By

Attorney

Sept. 25, 1956 E. S. PURINGTON 2,764,630

TELEVISION TRANSMISSION SYSTEM

Filed April 1, 1952 3 Sheets-Sheet 3

Inventor

ELLISON S. PURINGTON.

By

Attorney

United States Patent Office 2,764,630 Patented Sept. 25, 1956

2,764,630

TELEVISION TRANSMISSION SYSTEM

Ellison S. Purington, Gloucester, Mass., assignor to John Hays Hammond, Jr., Gloucester, Mass.

Application April 1, 1952, Serial No. 279,733

4 Claims. (Cl. 178—5.8)

This invention relates to an improved method of transmitting a still picture over a standard television channel.

In a previous application Serial No. 152,174, filed Mar. 27, 1950, I have shown a method of breaking a television program, injecting a video cuing signal followed by a still picture and then restoring the original program. The cuing or control signal is for the purpose of putting the receiver device into operation so that it will record the still picture when it is formed by the receiver television kinescope.

One of the objects of this present invention is to provide an improved cuing signal.

Another object is to provide improvements in the timing of the switching of the various signals.

The invention also consists in certain new and original features of construction and combinations of parts hereinafter set forth and claimed.

The nature of the invention, as to its objects, and advantages, the mode of its operation and the manner of its organization, may be better understood by referring to the following description, taken in connection with the accompanying drawings forming a part thereof, in which Fig. 1 is a schematic diagram of a control signal generator circuit embodying the present invention.

Like reference characters denote like parts in the several figures of the drawing.

In the following description parts will be identified by specific names for convenience, but they are intended to be generic in their application to similar parts.

Figure 1:
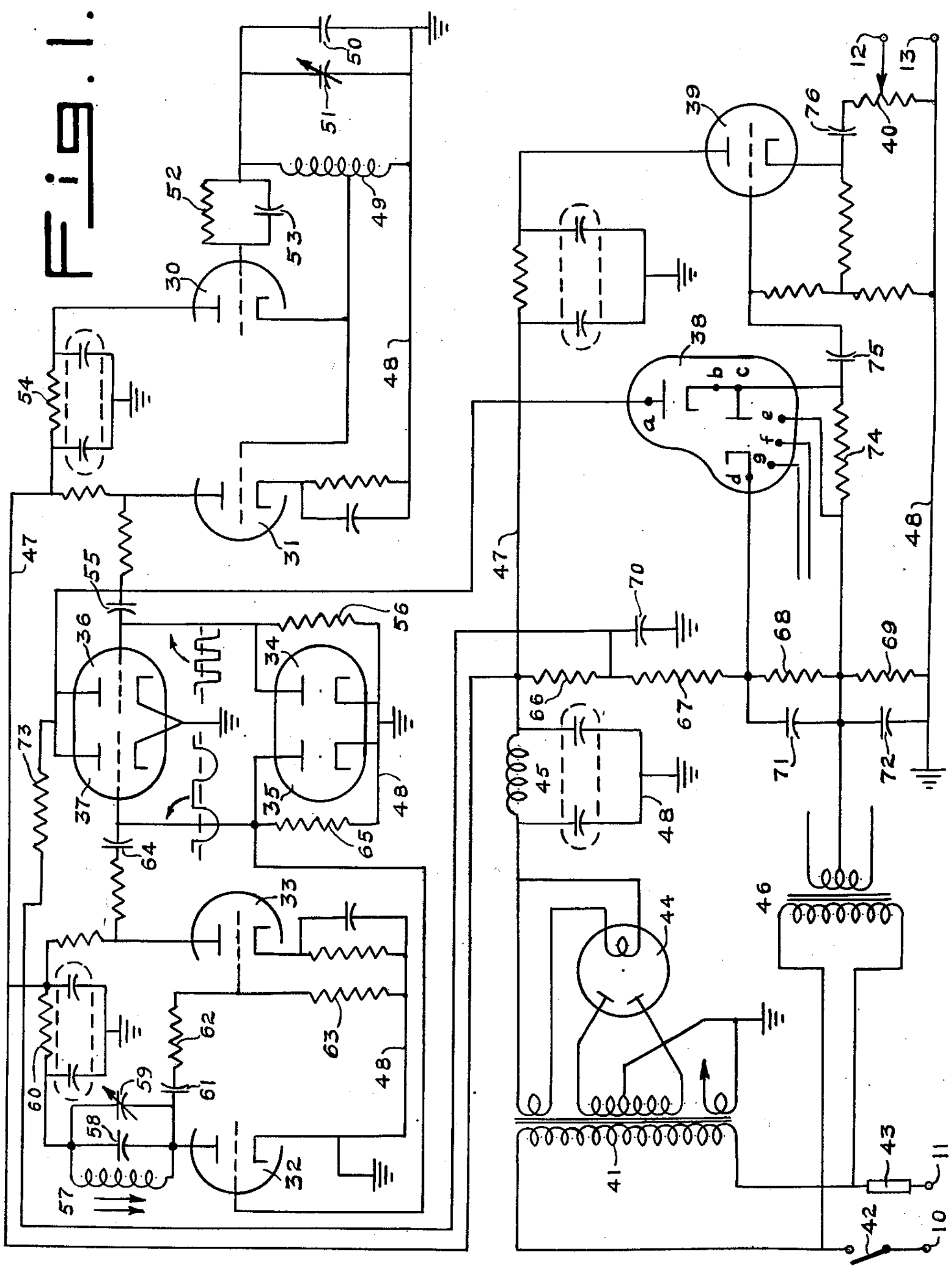
Figure 2:
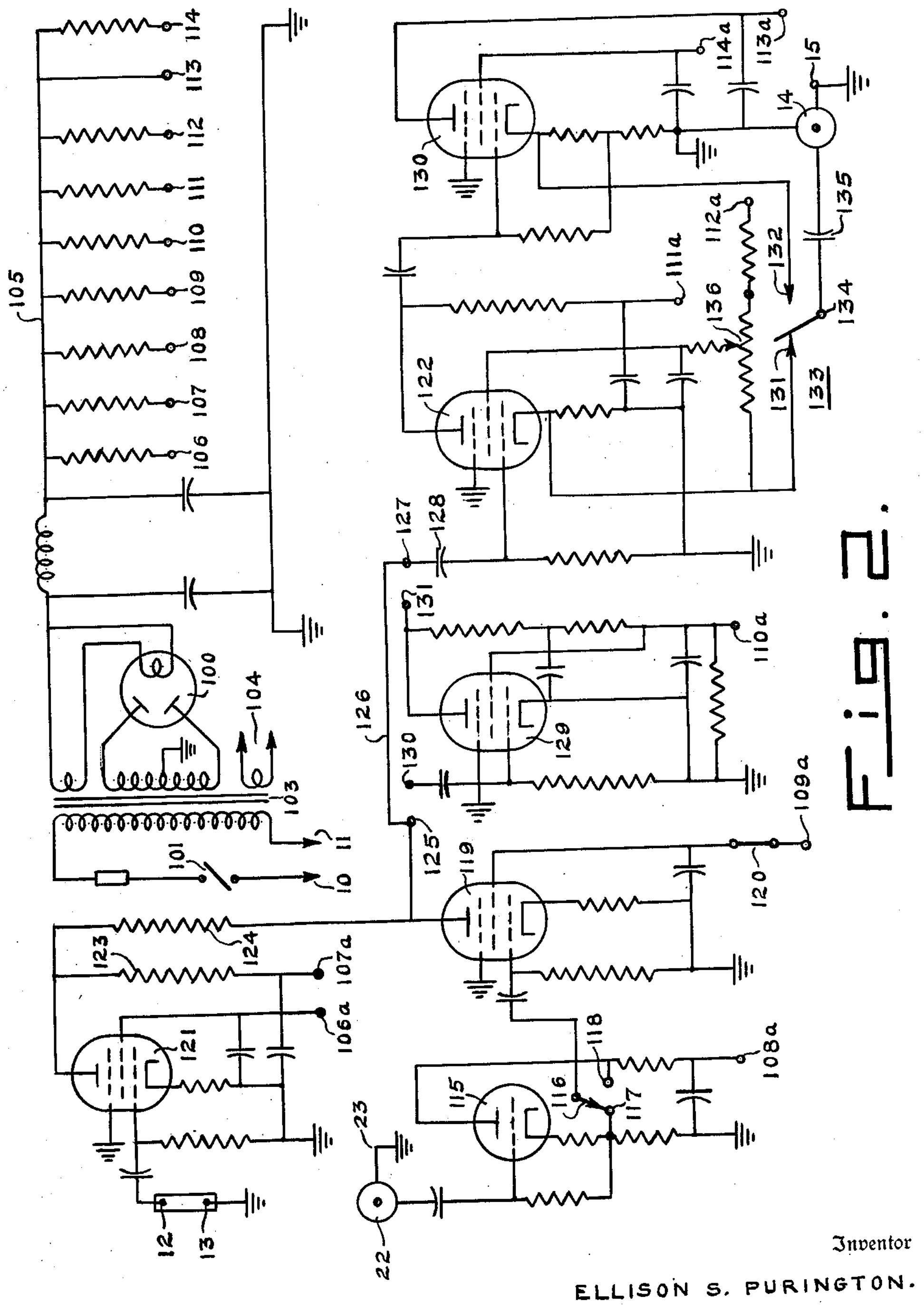
Fig. 2 is a schematic diagram of a blanking circuit.

It is to be understood that the circuits of these three figures are interconnected to form one complete system. Thus in all figures terminals 10, 11 are power input terminals connected to a common A. C. power source; the output terminals 12, 13 of Fig. 1 are connected to the control signal terminals 12, 13 of Fig. 2; the output terminals 14, 15 of Fig. 2 are connected to the control terminals 14, 15 of Fig. 3. Other external terminals are connected to devices not shown. Thus in Fig. 3, terminals 16, 17 are connected to a television camera system which is supplying video signals from the still picture to be transmitted when the system is rendered operative; terminals 18, 19 are connected to the normally scheduled program source; terminals 20, 21 are connected to a line that feeds the video radio transmitter.

In some installations, the normal input signal applied at terminals 18, 19 is provided with horizontal and vertical blanking. That is, at the end of the picture carrying portions of the horizontal and vertical sweeps, corresponding to the picture normally seen on a television screen, the signal is brought to a fixed value corresponding to complete black, and this condition is caused to exist until the start of the next picture carrying portion of the horizontal and vertical sweeps. This produces the effect of a blank area or a black frame around the picture area in which the signal is brought to a fixed level and the horizontal and vertical synchronizing signals are superimposed on this fixed level signal at a later stage. For such systems, it is necessary that the control signal applied at terminals 14, 15 and the news signal applied at terminals 16, 17 be similarly blanked.

This process of blanking is normally accomplished by use of blanking signals furnished by the synchronizing signal generator of a television transmitter. These signals comprise a chain of rectangular pulses which are "on" when the transmitter is sending the synchronizing pulses for the receiver sweep circuits (usually called the "blacker than black" pulses) and are "off" when the transmitter is sending picture information.

Accordingly, I provide for this blanking of the control signal generator of Fig. 1 by utilizing blanking pulses applied externally on terminals 22, 23 of the circuit of Fig. 2.

Figure 3:
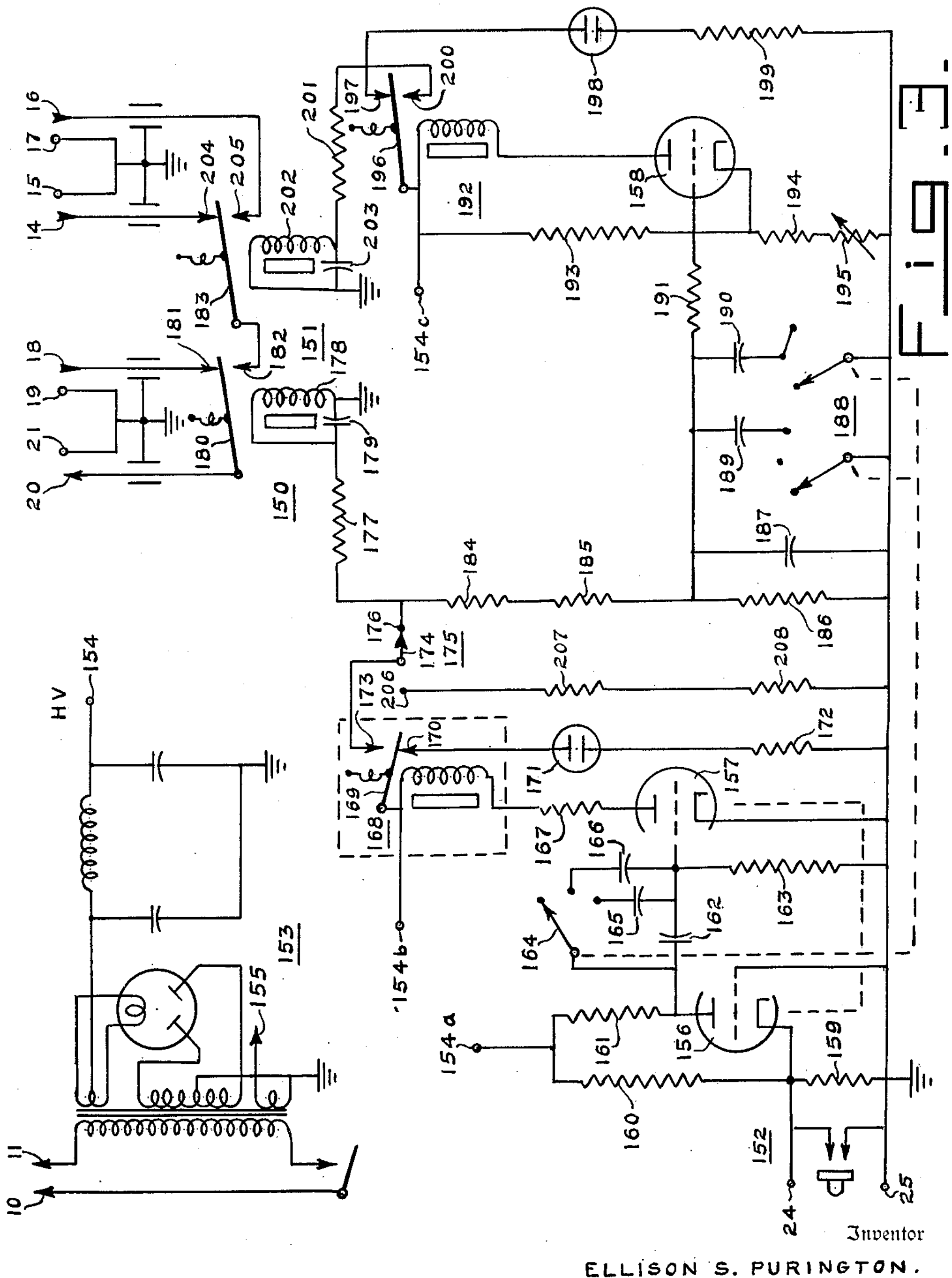
Fig. 3 is a schematic diagram of a switching circuit.

In Fig. 3, terminals 24 and 25 are connected by a line to a distant control switch or push button, for manual timing of the insertion of the control and news signal into the television system.

As seen from the figures, all odd numbered terminals from 13 to 25 are connected to a common ground, and therefore are connected together, and all even numbered terminals from 12 to 24 are the active or "hot" terminals of the system.

My system comprises in general a control pattern circuit (Fig. 1) in which a control signal is generated which is equivalent to a signal that would be produced by scanning a control pattern (a checkerboard pattern in this instance). The fixed level blanking signal, derived from the usual synchronizing signal generator supplying the video is superimposed on the pattern output of Fig. 1 in the combining circuit of Fig. 2 to produce a properly blanked pattern signal which is suitable for insertion in the video channel without disturbing the operation of the transmitter, and the control pattern signal, followed by the still "news" picture, is inserted in the video channel during a break in the video signal in proper timed sequence by the timing circuit of Fig. 3. This timing may be adjusted within limits, preferably while maintaining about equal periods for the control pattern signal and for the still picture signal.

Referring more specifically to Fig. 1, this system provides a control signal comprising a substantially square wave train of pulses of a higher frequency which are square wave blanked or amplitude modulated at a lower frequency. For this purpose, higher frequency oscillations produced by use of triodes 30, 31 and lower frequency oscillations produced by use of triodes 32, 33 are applied to rectifiers 34 and 35 to produce substantially square wave pulses of current, to the anodes of triodes 36 and 37. The resulting modulated voltage on the plates of both triodes is applied to a suitably biased rectifier-limiter 38 to eliminate the modulating or blanking signal. The resultant higher frequency square wave with square wave blanking at the lower frequency rate is fed through a cathode follower triode 39 to an output potential divider 40, which is connected to the output terminals 12, 13. Filament and plate supply power for the electron tubes are supplied in a conventional manner by use of transformer 41, switch 42, fuse 43, rectifier 44, filter 45 and transformer 46. The filaments of all tubes are heated from transformer 41, except those of rectifier 38, which are heated from transformer 46. Plate voltage from the filter is applied between main high voltage line 47 and ground line 48.

The higher frequency oscillation is produced by triode 30 in combination with a grid, cathode, ground circuit comprising tapped inductor 49, fixed capacitor 50 and variable capacitor 51, and the grid leak and condenser 52, 53. Anode voltage is supplied from line 47 through resistor 54, both ends of which are bypassed to ground.

Oscillations produced in triode 30 in a well known manner are applied to the grid of an amplifier triode 31 by a connection from the cathode of triode 30. After amplification by triode 31, the oscillations are applied through capacitor 55 to the grid of triode 36 which is connected to ground through resistor 56. The grid is also connected to the anode of rectifier diode 34, the cathode of which is grounded. Because of the low impedance of diode 34 while rectifying, the positive swing of the impressed oscillation is deleted and negative half sine oscillations only are applied to the grid of triode 36. The peak negative voltage of these oscillations is several times that necessary to cut off the anode current of the triode. Accordingly the grid signal is adapted to produce substantially square wave anode current for triode 36.

The lower frequency oscillation is similarly produced by triode 32, with frequency determined by variable inductor 57 shunted by capacitors 58 and 59. These are in the lead from the anode of triode 32 to the plate supply line 47, through dropping resistor 60 suitably bypassed to ground. Oscillations in this circuit 57, 58, 59 are fed through capacitor 61 and resistor 62 to the grid of triode 33, where the amplified and phase reversed oscillations are fed through capacitor 64 to the grid of triode 37, which is connected to ground through resistor 65 and through the anode-cathode path of diode 35 when conducting. The grid of triode 37 and the anode of diode 35 are connected to the grid of triode 32, to provide feedback for maintaining the oscillations. Thus the oscillations in the resonant circuit 57, 58, 59 are sustained by substantially square wave pulses of current in an oscillatory system with the grid-cathode path of the triode substantially non-conducting.

Thus it is seen a system is provided for pulsing the grids of triodes 36 and 37 negative with respect to ground, with substantially square topped waves of different frequencies, in a manner to produce square wave anode currents. To provide for modulating one series of pulses by the other, a tapped resistor is connected across the high voltage line 47 to ground line 48, with four sections 66, 67, 68, 69, with provision by capacitors 70, 71, 72 to free these resistors from A. C. components of current.

The junction of resistors 66 and 67 is connected through resistor 73 to both the anodes of triodes 36 and 37, which in turn are connected to anode 38*a* of duo-diode 38, the corresponding cathode of which, 38*b* is connected to one end of resistor 74, the other end of which is connected to the junction of resistors 68 and 69. The cathode 38*b* is connected to the other anode 38*c*, the corresponding cathode of which, 38*d*, is connected to the junction between resistors 67 and 68. The shield terminal 38*e* of the duo diode is connected to the junction between resistors 68 and 69 and to the center tap of the secondary of transformer 46, the ends of which are connected to the duo diode filament terminals 38*e* and 38*f* by wires not shown.

In this circuit, the potential of the anodes of triodes 36 and 37 increases as the grids of the triodes become more negative. Adjustments are made so that no current passes from anode 38*a* to cathode 38*b* due to negative voltage on the grid of triode 36, unless the grid of triode 37 is also negative. Therefore no pulses occur in the output resistor 74 due to the pulse train fed through capacitor 55 except during the negative portion of the pulse train fed through capacitor 56. As a result, there is developed across resistor 74 a series of high frequency pulses which are blanked, or square wave modulated, at the lower frequency rate. These pulses are clipped by the current flow from anode 38*c* to cathode 38*d* to establish a pulse amplitude corresponding to the D. C. voltage drop in resistor 68. Thereupon the pulses are applied through capacitor 75 to the cathode follower triode 39, and subsequently through capacitor 76 to the output potentiometer 40.

The blanking circuit, Fig. 2, provides for modifying the signals from the circuit of Fig. 1 impressed on terminals 12, 13, in accordance with blanking signals impressed upon terminals 22, 23, before delivery to the circuit of Fig. 3 from terminals 14, 15. This circuit includes a rectifier tube 100 with assocaited circuits such that when switch 101 is closed to connect the rectifier system to a power source 10, 11, filament and plate power will be supplied to the various electronic circuits. Thus filament power is supplied to the heaters of the various tubes from the winding 104 of transformer 103 by wires not shown. Similarly plate voltage is supplied from high voltage line 105 through various resistors to terminals 106 to 114 which are connected individually to terminals 106*a* and 114*a* respectively of the various tube assemblies by lines not shown.

The blanking circuits are of a standard construction and will not be described in detail.

Triode 115 provides for reversing the phase of the blanking wave form, by using a switch 116 with contacts 117 and 118, so that blanking signals for the grid of pentode 119 may be supplied from the cathode or the anode circuit of triode 116. The switch should be so set that the first grid of 119 is most positive during that part of the blanking pulse from terminals 22, 23, which is desired to correspond to no signal at output terminals 14, 15 due to the signal to be blanked applied at terminals 12, 13. When this first grid is most positive, the anode to ground path of tube 119 is of lowest plate impedance; when it is most negative, it is of highest plate impedance. If it is desired that the tube 119 be inoperative to cause blanking, the switch 120 is to be opened thereby causing the second grid to fall to substantially cathode potential and cutting off anode to cathode flow in tube 119 regardless of the condition of the first grid.

Pentode 121 serves as an amplifier of the signals to be blanked, and is so connected that the amount of output from its anode to the first grid of the subsequent pentode 122 is modified by the anode to cathode shunting action of the blanking pentode 119 above described. That is, the plate voltage supply terminal 107*a* is connected through resistor 123 to the anode of pentode 119, which in turn is connected by terminal 125, jumper 126, terminal 127 and D. C. blocking capacitor 128 to the grid of pentode 122. The signal pulses impressed upon pentode 121 will pass to pentode 122 completely only when tube 119 is not passing current, and will not pass effectively when tube 119 is passing a great amount of current. In this manner the signal from pentode 121 to pentode 122 is blanked by the action of pentode 119 in accordance with the blanking wave form impressed on triode 115. A circuit 129 is provided for use, if desired, in causing the amount of signal to pentode 122 to be fairly independent of the amount of signal on pentode 119, and can be rendered operative by the removing link 126, then connecting the terminal 125 and 130 together, and finally connecting the terminals 127 and 131 together. However since in the present case the signals on terminals 12—13 are of a fixed nature, the use of the circuit 129 may not be required. When used, however, it operates as a limiter in a well known manner.

Pentodes 122 and 130 provide for delivering the blanked signals to output terminals 14, 15, in proper phased senses, of proper magnitude and suitably low internal impedance for the source. These pentodes are arranged in cascade. The cathodes of the pentodes are connected to terminals 131 and 132 of a switch 133 with movable arm 134 connected through D. C. blocking capacitor 135 to the output terminal 14. The voltages on these two cathodes are oppositely phased, whereby the switch setting provides for a choice of the phase relation of the blanked output signals at terminals 14, 15 with respect to the unblanked input signals at terminals 12, 13. A potentiometer 136 provides for adjusting the screen potential of pentode 122 for adjusting the output voltage value. Constants are so chosen that the amount of the output signal is the same regardless of the position of the switch 134.

Thus, in Fig. 2 is provided a system such as may be necessary to blank the control signal provided by Fig. 1 as may be required.

The circuit of Fig. 3 now provides for determining the nature of the signal to the video transmitter connected externally to terminals 20 and 21. This is determined by the positions of the armatures of relays 150 and 151, which are determined by a timing circuit the operation of which is initiated by use of a push button 152 or a similar button or key externally connected across terminals 24 to 25. Power for the electronic circuit is provided by a power pack 153 of well known construction with output D. C. voltage terminal 154 and filament terminal 155, the returns for plate and filament being through ground connections. It will be understood the power pack is operatively connected to heat the filaments of the various tubes by use of connections not shown, and that the output D. C. terminal 154 is connected to various plate supply terminals **154*a*, 154*b* and 154*c*** also by connectors not shown. It will be further understood that all ground connections are made to a metal chassis supporting the various members.

The operation and timing of relay 150 is determined by the action of triodes 156 and 157. The delay time from the operation of relay 150 to the operation of relay 151 is determined by the action of triode 158.

The cathode of triode 156 is connected to ground through resistor 159 across which the push button 152 is bridged, and is connected through resistor 160 to voltage supply terminal **154*a*, which in turn is connected through resistor 161 to the anode of triode 156, the grid of which is grounded. With the button open, the constants are such that no current flows through resistor 161, but large current flows when the button is closed bringing the cathode to grid and ground potential. The anode of tube 156 is connected through capacitor 162 to the grid of triode 157, which is connected to ground through resistor 163. By use of a switch 164, capacitors 165 or 166 may be placed in parallel with capacitor 162. The cathode of triode 157 is connected to ground, the anode is connected through resistor 167 and the winding of a relay 168 to the plate supply terminal 154*b*. The constants are such that normally the relay 168 is closed to connect terminal 154*b* through the relay armature 169 to a front contact 170 which is connected through a glow lamp 171 and resistor 172 to ground. When button 152 is closed, causing current to flow through resistor 161, the grid of triode 157 is sent negative beyond cut-off for this tube, due to the lowering of the potential of the anode of tube 156 and to the inability of the capacitor 162 to change its voltage abruptly. This releases the relay armature 169 to bring it to the upper contact 173 which is connected through the center point 174 of a switch 175 normally connected as shown to right contact 176, thence through the resistor 177 and winding 178 of relay 150 to ground, this winding being shunted if desired, by capacitor 179. Current flowing from the terminal 154*b* to ground through the relay 150 causes it to operate to pull in its armature 180, connected to output line 20. Now the back contact 181 of this relay is connected to terminal 18, while the front contact 182 is connected to the armature 183 of relay 151. Therefore while relay 180 is closed, the normal connection from the regular program by terminal 18 is disconnected from the transmitter, and the transmitter is actuated from whatever signal is impressed on armature 183. The normal connection of relay 168 is restored after a suitable time when the capacitor 162 has changed its charge and the grid of triode 157 returns sufficiently toward its normal zero value. The amount of time that the relay 168 is operative to break the normal program is therefore determined by the constants of the circuits associated with triodes 156, 157, and by the setting of the timing switch 164, and the amount of time is indicated by the interval that the glow lamp 171 is out. After restoration of the glow lamp indicating the return of the relay 178 to normal, the button 152 may be released, and this produces no action since the resulting pulse through capacitor 162 is in such a sense to increase the current in relay 168** which is already closed.

The switch contact 176 is also connected through resistors 184, 185 and 186 to ground through which current flows when the relay 168 is opened and 150 is closed. The resistor 186 is shunted by capacitor 187 which by use of a switch 188 may be paralleled by capacitor 189 or capacitors 189 and 190. The junction of resistors 185 and 186 is connected through resistor 191 to the grid of triode 158, the anode of which is connected through the winding of a relay 192 to the plate supply terminal **154*c*. The cathode of triode 158 is connected to terminal 154*c* by resistor 193, and to ground through resistor 194 and rheostat 195. The armature 196 of relay 159 is connected to supply terminal 154*c* and is normally against a back contact 197 connected through glow lamp 198 and resistor 199 to ground. The front contact 200 is connected through resistor 201 and winding 202 of the relay 151 to ground, and the winding may be shunted by a capacitor 203**.

When relay 168 is released and 150 operates, voltage is impressed across the resistors 184, 185 and 186 to charge the capacitor 187. The adjustments are such that normally the cathode of triode 158 is sufficiently high in potential that the relay 192 is not operative. After sufficient time determined by the constants, the setting of the main timer switch 188 and of the vernier timer 195, the triode 158 passes sufficient current to operate the relay 192. This operates the relay 151 and extinguishes the glow lamp 198. The armature 183 of relay 151 is normally connnected to back contact 204 actuated by the control signal impressed from the circuits of Figs. 1 and 2 upon terminal 14. When after the time delay, the relay 202 closes, the armature 183 is connected to a front contact 205 connected to terminal 16 actuated from the news source not shown.

The two timing control switches 164 and 188 may be uni-control, and the constants so chosen that with the vernier 195 at mean setting, the time interval between closure of relays 150 and 151 is about half the time that the relay 150 is closed, for all settings of the unicontrol switches. This provides for equal time being devoted to the control signal and the news signal during the break in the normal program. The vernier provides for varying the proportioning of the time in any desired manner.

Switch 175 is thrown to the right to connect contact 169 with contact 176 only after the power pack has been turned on and the relay 168 has been pulled in, as will be indicated by glow lamp 171. In this manner the relay 178 is not operated while the power pack is producing high voltage but the filament of triode 157 has not heated sufficiently to cause the current to flow and pull in relay 168. Similarly the switch 175 should be thrown to the left prior to cutting off the power pack. The left contact of the switch 206 may be connected through resistors 207 and 208 to ground to serve as a load on the power pack system 153 at the start of the operation.

It is seen, therefore, that the circuit of Fig. 3 provides a timing system for breaking the normal television program, for a predetermined interval of time, during which a control or cuing signal is sent followed by the transmission of a news picture. This is accomplished by a push button which is to be released after the system has been restored. Two glow lamps provide for indicating the condition of the circuit. Both are operative during normal program conditions, one is extinguished for the duration of the break, and the other is extinguished thereafter when the control signal to the transmitter ceases and the news starts. The system is self restoring to normal at the end of the operation.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A system for transmitting a still picture over a television channel during a break in a continuous television program, comprising a television transmitter responsive to television signals, a source of television signals normally connected to said transmitter having means producing signals representing a continuous television program, a second source of television signals having means producing a signal representing a predetermined control pattern, a third source of television signals having means producing signals representing a still picture, a selector circuit including first and second relays connected to disconnect said first source from said transmitter and respectively to connect said second or third source to said transmitter, a control circuit connected to actuate said relays and including a timing circuit arranged to cause said first relay to operate and hold for a predetermined time period and to cause said second relay to operate, hold for a predetermined time period, and release during the holding period of said first relay and a voltage divider circuit connected to control the relative time periods whereby the periods may be varied while maintaining the same ratio.

2. In a transmission system, as set forth in claim 1, adjustable capacitors connected to control the holding periods of the respective relays and means adjusting said capacitors in unison for varying both of said holding periods in the same sense.

3. A system for transmitting a still picture over a television channel during a break in a continuous television program, comprising a television transmitter responsive to television signals, a source of television signals normally connected to said transmitter having means producing signals representing a continuous television program, a second source of television signals having means producing a signal representing a predetermined control pattern, a third source of television signals having means producing signals representing a still picture, a source of blanking signals forming a blanked frame around the television signals from said first source, means superimposing blanking signals from said last source onto the signals from said second and third sources to provide signals of similar synchronizing characteristics from the three sources, a selector circuit having means selectively connecting said sources to energize said transmitter and timed control means operable to disconnect said first source and connect said second source to said transmitter, and then to disconnect said second source and connect said third source to said transmitter in a timed sequence.

4. A control signal generator for producing a television signal equivalent to the signal produced by scanning a checkerboard pattern, comprising means generating pulses in the form of a square wave train of a predetermined frequency, means generating a wave of a lower frequency, means modulating said wave train by said lower frequency wave to blank out said square wave at intervals corresponding to said lower frequency to produce thereby a signal representing a checkerboard pattern, a source of blanking signals corresponding to a blanked frame around a television image, means superimposing said last signals onto said blanked square wave train, a television transmitter, and means modulating said transmitter by said wave train with said superimposed signals to transmit thereby a checkerboard pattern with blanked frame.

References Cited in the file of this patent

FOREIGN PATENTS

| | | |
|---|---|---|
| 2,193,869 | Goldsmith | Mar. 19, 1940 |
| 2,298,964 | Bartelink | Oct. 13, 1942 |
| 2,420,029 | Brady | May 6, 1947 |
| 2,429,921 | Brady | Oct. 28, 1947 |
| 2,585,034 | Purington | Feb. 12, 1952 |
| 2,611,027 | Hammond | Sept. 16, 1952 |
| 2,642,492 | Hammond | June 16, 1953 |
| 2,656,412 | Hammond | Oct. 20, 1953 |